(12) United States Patent
Ellis

(10) Patent No.: US 6,557,304 B2
(45) Date of Patent: *May 6, 2003

(54) DECORATIVE MOLDING ASSEMBLY FOR A VEHICLE DOOR FRAME

(75) Inventor: Peter J. Ellis, Rochester Hills, MI (US)

(73) Assignee: Decoma Exterior Trim Inc., Concord (CA)

( * ) Notice: Subject to any disclaimer, the term of this patent is extended or adjusted under 35 U.S.C. 154(b) by 118 days.

This patent is subject to a terminal disclaimer.

(21) Appl. No.: 09/794,452

(22) Filed: Feb. 27, 2001

(65) Prior Publication Data

US 2001/0017005 A1 Aug. 30, 2001

Related U.S. Application Data

(63) Continuation of application No. 09/215,801, filed on Dec. 18, 1998, now Pat. No. 6,205,712.
(60) Provisional application No. 60/094,526, filed on Jul. 29, 1998.

(51) Int. Cl.⁷ .............................................. E05D 15/16
(52) U.S. Cl. .......................................... 49/441; 49/377
(58) Field of Search .................... 49/441, 377, 440, 49/442, 444, 436, 428, 475.1, 443, 490.1, 489.1, 375, 374, 482.1; 52/502, 503; 296/146.2, 146.16, 146.9, 146.15

(56) References Cited

U.S. PATENT DOCUMENTS

| 2,169,503 A | 8/1939 | Schlegel |
| 2,169,504 A | 8/1939 | Schlegel |
| 2,223,459 A | 12/1940 | Reid |
| 2,236,827 A | 4/1941 | Mollet |
| 2,266,801 A | 12/1941 | Reid |
| 2,899,238 A | 8/1959 | Swanson |
| 4,614,061 A | 9/1986 | Brocke |
| 4,649,668 A | * 3/1987 | Skillen et al. ............ 49/441 X |
| 4,800,681 A | * 1/1989 | Skillen et al. ............... 49/400 |
| 4,945,681 A | 8/1990 | Nozaki et al. |
| 5,001,867 A | 3/1991 | Dupuy |
| 5,010,689 A | * 4/1991 | Vaughan ..................... 49/440 |
| 5,014,464 A | 5/1991 | Dupuy et al. |
| 5,024,480 A | * 6/1991 | Petrelli .............. 296/146.15 X |
| 5,042,200 A | 8/1991 | Ugawa |
| 5,054,242 A | 10/1991 | Keys et al. |
| 5,056,850 A | 10/1991 | Katcherian et al. |
| 5,067,281 A | 11/1991 | Dupuy |
| 5,085,006 A | 2/1992 | Hayashi et al. |
| 5,163,248 A | * 11/1992 | Bielis et al. .................. 49/441 |

(List continued on next page.)

FOREIGN PATENT DOCUMENTS

| DE | 3126491 | 1/1983 |
| DE | 4028898 | 9/1990 |
| EP | 368521 | 5/1990 |
| EP | 428425 | 5/1991 |
| EP | 524447 | 1/1993 |
| EP | 618101 | 10/1994 |
| EP | 668178 | 8/1995 |
| EP | 743207 | 11/1996 |
| JP | 6106994 | 4/1994 |

Primary Examiner—Daniel P. Stodola
Assistant Examiner—Hugh B. Thompson
(74) Attorney, Agent, or Firm—Howard & Howard

(57) ABSTRACT

A decorative molding assembly for a vehicle door frame having a window opening for a transitional window pane moveable between open and closed positions. The molding assembly includes a window seal mounted to the door frame and having a channel for selective sealing engagement with the window pane. A molding strip has an arm mating with the window seal and faces outward to provide an appealing appearance. A retaining member engages the arm of the molding strip and the window seal to secure the molding strip and the window seal within the window opening of the door frame such that the window pane is securely sealed within the window opening when the window pane is in the closed position.

9 Claims, 6 Drawing Sheets

U.S. PATENT DOCUMENTS

| | | | |
|---|---|---|---|
| 5,168,668 A | * 12/1992 | Mishima et al. | 49/440 |
| 5,174,066 A | 12/1992 | Dupuy | |
| 5,195,274 A | * 3/1993 | Mishima et al. | 49/441 |
| 5,356,194 A | * 10/1994 | Takeuchi | 49/475.1 X |
| 5,396,733 A | 3/1995 | Dupuy | |
| 5,548,929 A | * 8/1996 | Larsen et al. | 49/441 |
| 5,590,926 A | * 1/1997 | Nozaki | 49/441 X |
| 5,702,148 A | * 12/1997 | Vaughan et al. | 49/490.1 X |
| 5,732,509 A | 3/1998 | Buehler et al. | |
| 5,743,047 A | * 4/1998 | Bonne et al. | 49/490.1 |

* cited by examiner

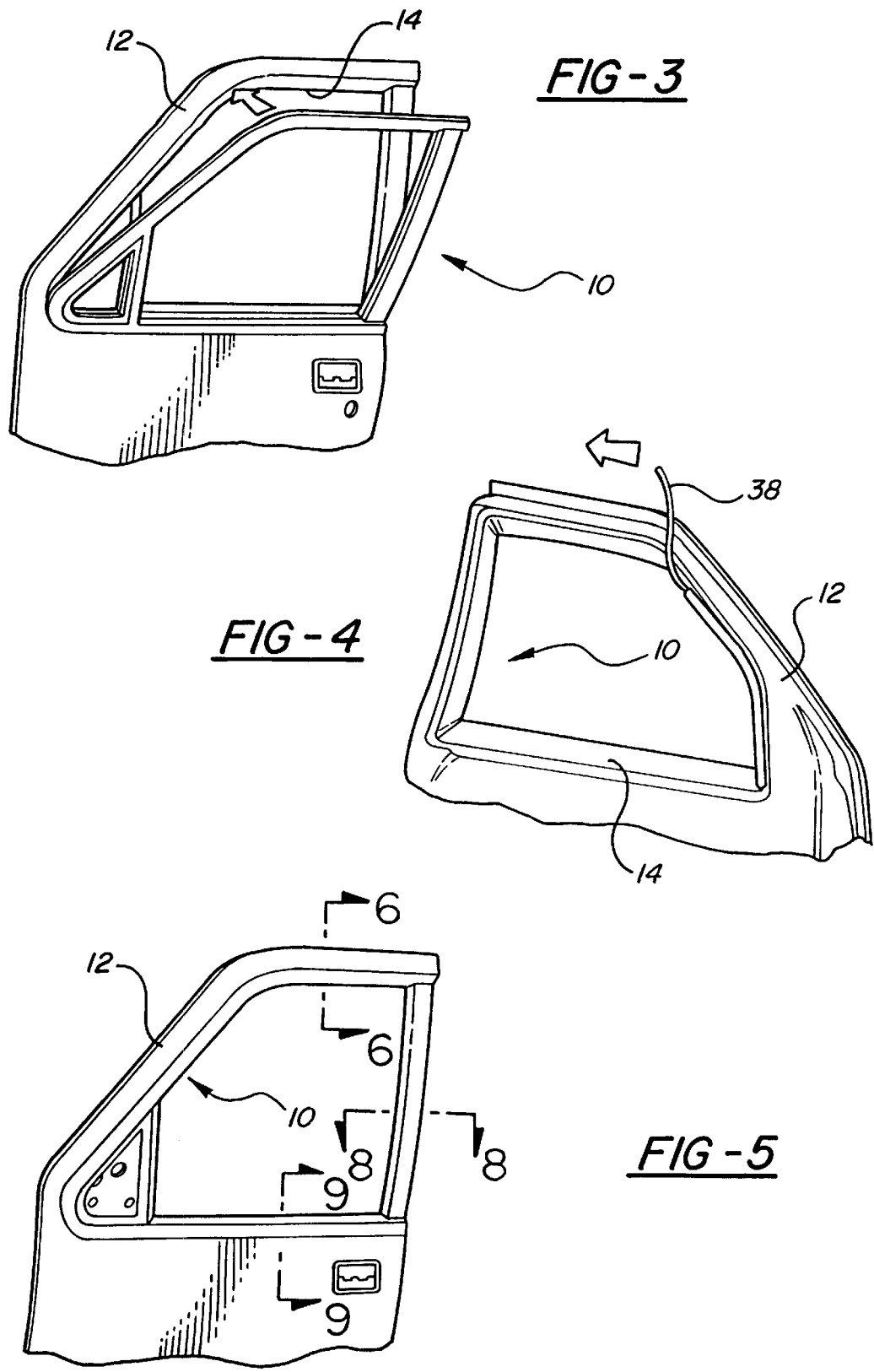

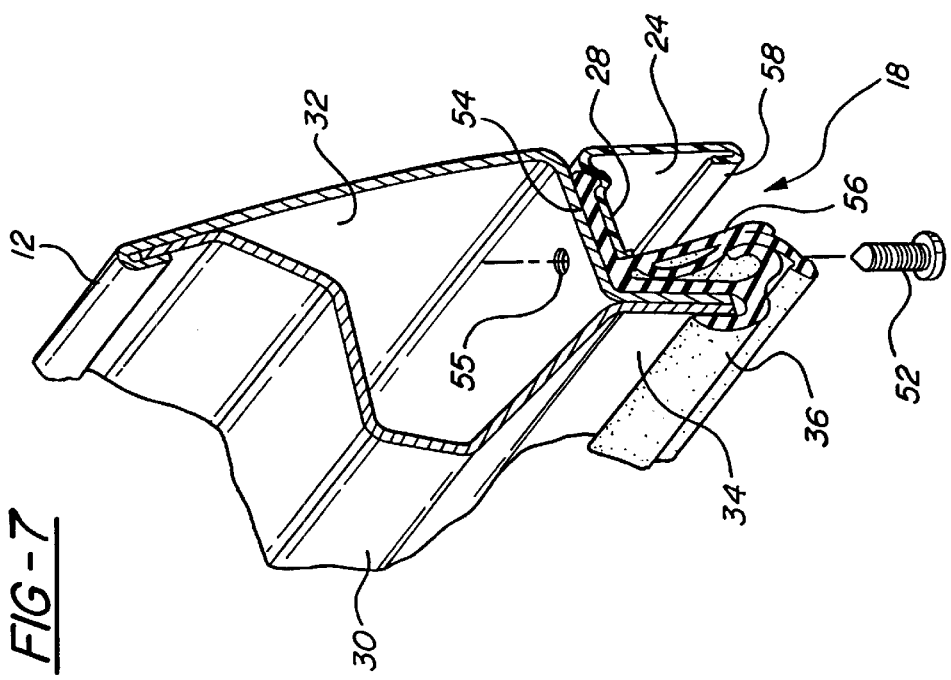
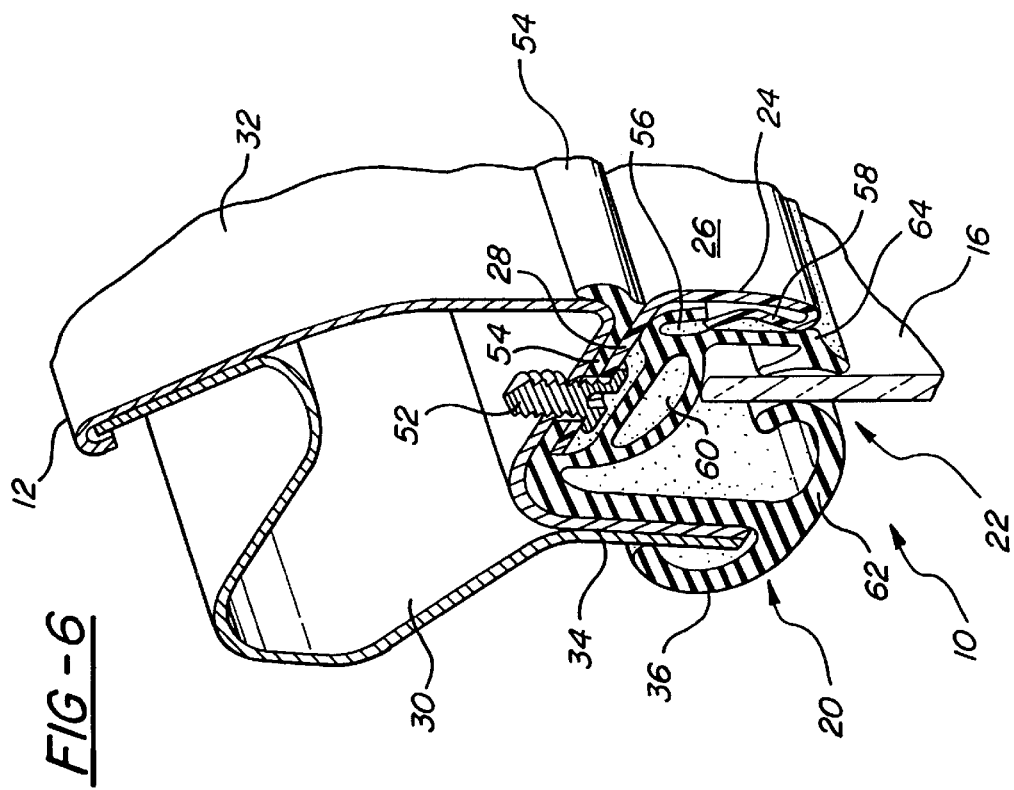

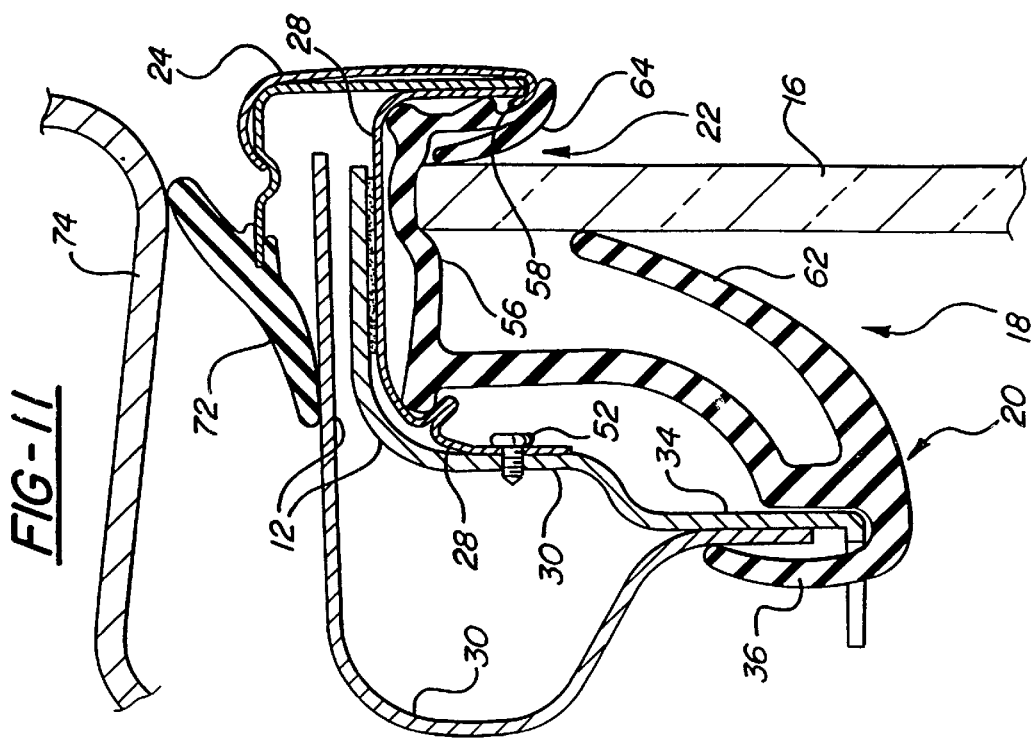
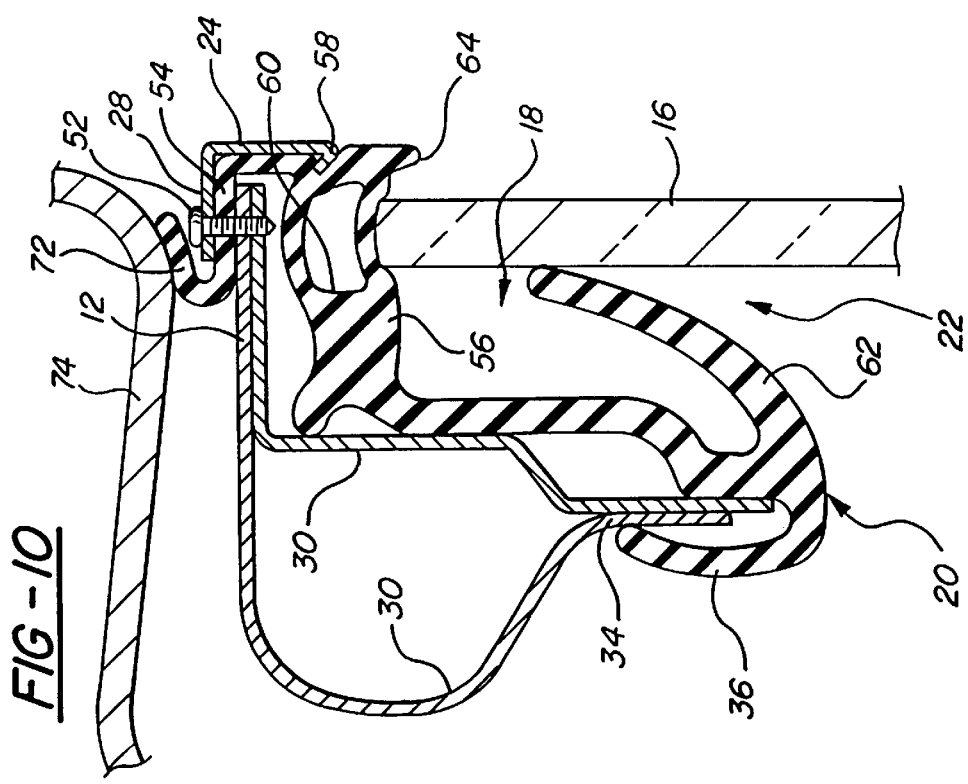

DECORATIVE MOLDING ASSEMBLY FOR A VEHICLE DOOR FRAME

RELATED APPLICATION

This patent application is a continuation of application Ser. No. 09/215,801, filed Dec. 18, 1998 now U.S. Pat. No. 6,205,712, which claims priority to and all the benefits of U.S. Provisional Patent Application Ser. No. 60/094,526, filed on Jul. 29, 1998 and entitled "Window Surround Module".

BACKGROUND OF THE INVENTION

1) Technical Field

The subject invention relates to a molding strip for surrounding an outer periphery of a window opening in a vehicle door frame.

2) Description of the Prior Art

Virtually all vehicle doors have a window opening with a surrounding door frame for holding a transitional window pane in place. The prior art door frames typically utilize a window door seal which may be formed of multiple pieces. The door seals provide little or no structural support for sealing the window pane with which they are associated. The door seals are designed to prevent outside elements from entering the passenger compartment and to allow the window pane to move translationally without undue resistance. The window door seals are typically made of a black rubber or similar elastomeric material and are secured to both exterior and interior surfaces of the door frame. Hence, at least a portion of the rubber door seals are exposed to numerous exterior elements which may damage the seals. For example, rubber door seals have a tendency to be degraded by ultraviolet sunlight which will fade, crack and/or split the seal. In addition, rubber door seals cannot be colored or painted. The overall aesthetics of the vehicle doors can be significantly compromised by these exterior facing rubber door seals, especially in the current market of uniform coloring for vehicle bodies.

The prior art has contemplated the use of decorative molding strips used in association with the rubber door seals to improve the appearance of the exterior edge of the door frames. Typically, the molding strips can be colored or painted to match a desired body panel color or trim pattern. In other words, the molding strips can be colored to appear as an extension of the vehicle body. Some molding strips are attached to or molded into the exterior portion of the door seals. Other molding strips are initially welded to the door frames and then the door seal is mounted separately to the door frame. The prior art door seals typically require an internal support structure to ensure a secure mounting relationship with the door frame. The internal support structures are typically metal sheets molded within the door seal. Multiple operations are usually required to fasten the prior art door seals and molding strips to the door frame. Hence, it is desirable to have a molding strip with a window door seal which does not have an internal support structure and can be mounted to the door frame in a single manufacturing step.

SUMMARY OF THE INVENTION AND ADVANTAGES

A decorative molding assembly for a vehicle door frame having a window opening for a transitional window pane moveable between an open position spaced from the window opening and a closed position abutting the window opening. The assembly comprises a window seal having a retaining portion for engagement with the door frame and having a channel for selective sealing engagement with the window pane. A molding strip has an exterior facing surface for creating an outer peripheral border for the window opening of the door frame and an inwardly projecting arm mating with the window seal. A retaining member engages the arm of the molding strip and the window seal for securing each of the molding strip and the window seal within the window opening of the door frame such that the window pane is securely sealed within the window opening when the window pane is in the closed position.

Accordingly, the subject invention includes a molding strip and a window door seal which are simultaneously mounted to a door frame by a single retaining member. The window door seal does not require an internal support structure. Preferably, a portion of the door seal is wedged between the molding strip and the door frame which securely holds both the door seal and molding strip to the door frame. The door seal and molding strip are installed on the vehicle door frame in a single application. The molding strip can be colored to provide a pleasing appearance and there is only a small portion of the door seal which is visible from the exterior of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of the molding assembly being installed within the door frame;

FIG. 4 is a perspective view of the molding assembly showing an attachment cord for assisting in installing the molding assembly to the door frame;

FIG. 5 is a perspective view of the molding assembly installed within the door frame;

FIG. 6 is a cross-sectional view taken along line 6—6 of FIG. 5;

FIG. 7 is a cross-sectional view similar to FIG. 6 showing the engagement of a retaining member to secure the molding assembly to the door frame;

FIG. 10 is a cross-sectional view of an alternative embodiment of the molding assembly;

FIG. 11 is a cross-sectional view of another alternative embodiment of the molding assembly;

DETAILED DESCRIPTION OF THE PREFERRED EMBODIMENT

Referring to the Figures, wherein like numerals indicate like or corresponding parts throughout the several views, a decorative molding assembly is generally shown at 10 in FIGS. 1 through 5. The particular installation steps of FIGS. 2 through 5 are discussed in greater detail hereinbelow. The decorative molding assembly 10 is for a vehicle door frame 12 having a window opening 14 for a transitional window pane 16 moveable between an open position and a closed position. The molding assembly 10 extends about a periphery of the window opening 14. As illustrated, the molding assembly 10 is designed for a front vehicle door frame 12 having an area for mounting a side rear view mirror (not shown). As appreciated, the molding assembly 10 can be of any suitable configuration for most any type of front or side door frame design. As will be appreciated from the foregoing disclosure of the primary and alternative embodiments, the general shaping and external appearance of the molding assembly 10 are dictated by the door and window configuration, door frame construction and other design criteria.

Figure 1:
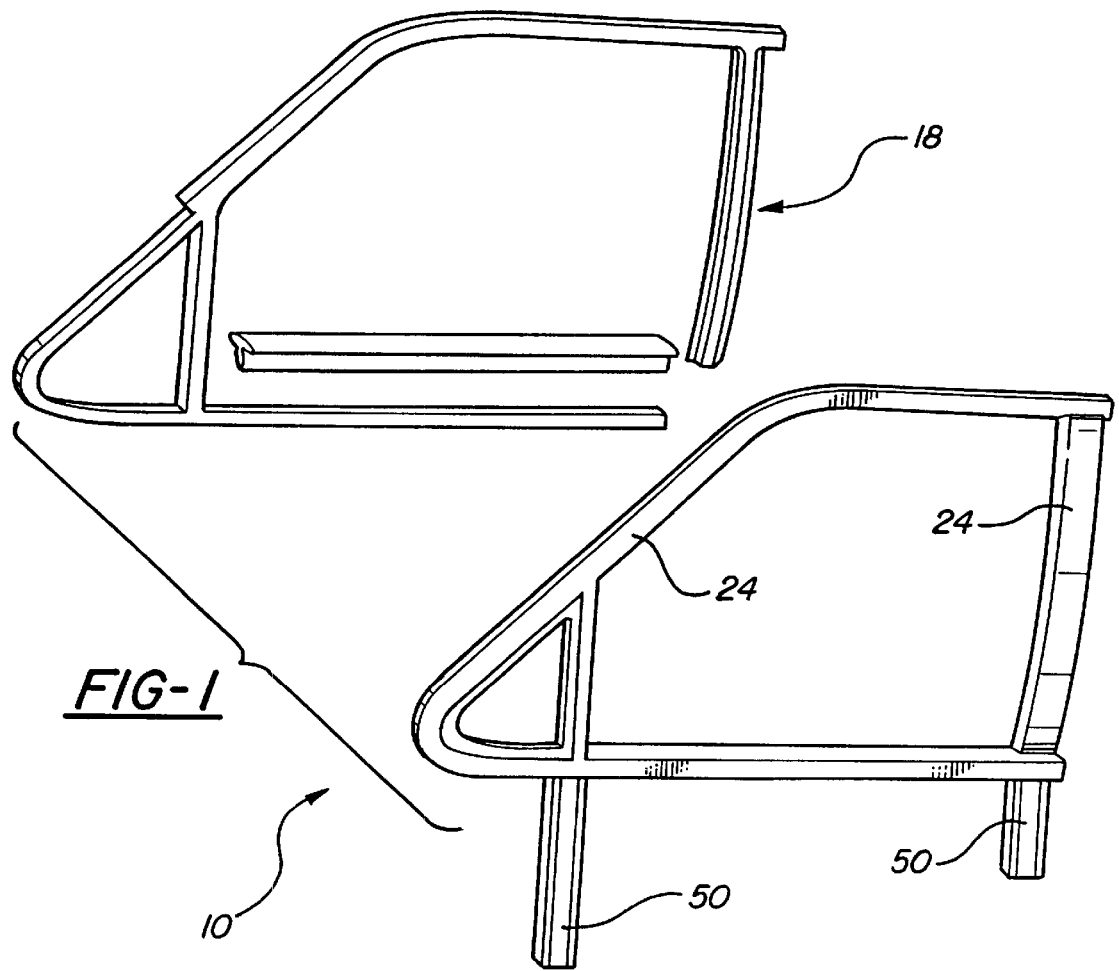
FIG. 1 is an exploded perspective view of the decorative molding assembly of the subject invention.
Figure 2:
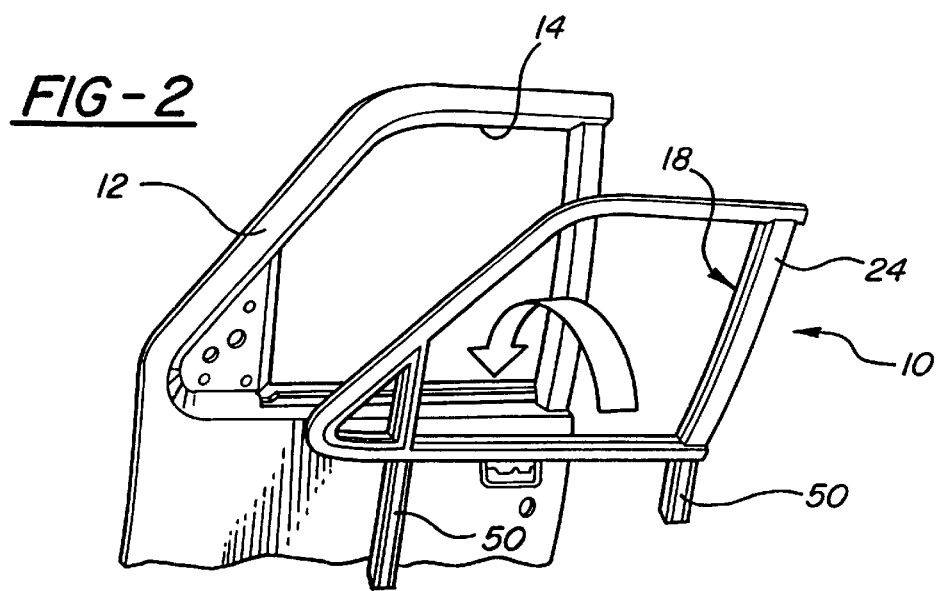
FIG. 2 is a perspective view of the molding assembly in spaced relationship with a vehicle door frame.
Figure 8:
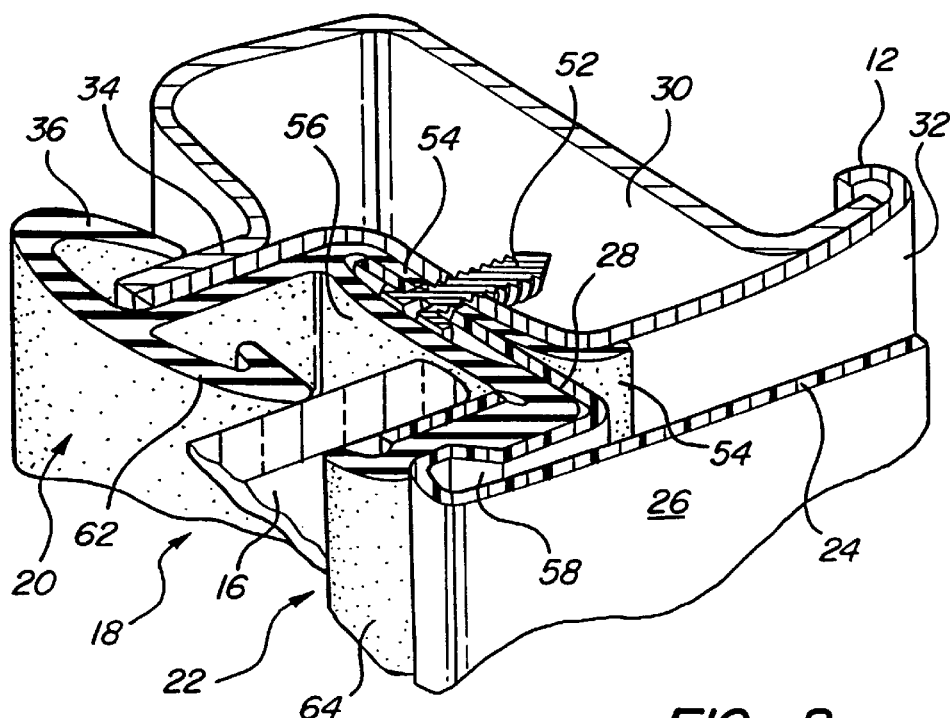
FIG. 8 is a cross-sectional view taken along line 8—8 of FIG. 5.

Referring also to FIGS. 6 through 8, FIGS. 6 and 7 illustrate an upper section of the molding assembly 10 and FIG. 8 illustrates a side section of the molding assembly 10. The molding assembly 10 comprises a window seal, generally shown at 18, having a retaining portion, generally shown at 20, for engagement with the door frame 12. The window seal 18 also has a channel, generally shown at 22, for selective sealing engagement with the window pane 16. A molding strip 24 has an exterior facing surface 26 for creating an outer peripheral border for the window opening 14 of the door frame 12. The molding strip 24 also has an inwardly projecting arm 28 mating with the window seal 18. The window seal 18 extends along the entire length of the molding strip 24 such that the entire window opening 14 can be sealed from exterior elements. The molding strip 24 acts as a support for the window seal 18 eliminating the need for an internal support structure. Hence, the window seal 18 can be manufactured by a relatively inexpensive single extrusion process.

In the preferred embodiment, the door frame 12 includes an inner panel 30 and an outer panel 32 which are attached together to form a flange 34. The inner 30 and outer 32 panels are shown in FIGS. 6 and 7 as having slightly different configurations which illustrate some different design constructions. As appreciated, the terms inner and outer and interior and exterior refer to the interior of the vehicle and the exterior of the vehicle. The retaining portion 20 of the window seal 18 includes a resilient appendage 36 for engagement with the flange 34 extending from the door frame 12. The appendage 36 is continuously biased toward the flange 34 which securely holds the window seal 18 to the flange 34. An attachment cord 38 is molded to the resilient appendage 36 for assisting in mounting the appendage 36 to the flange 34. The attachment cord 38, which is commonly called a zip strip, is best shown in FIG. 4. The cord 38 is preferably molded along the entire length of the appendage 36.

Figure 13:
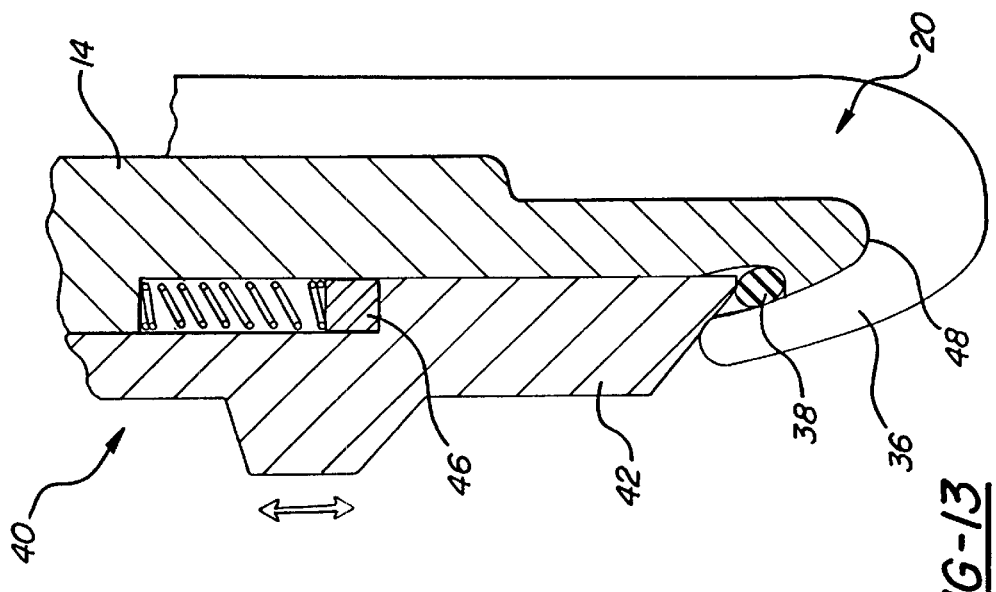
FIG. 13 is a cross-sectional view of a forming device for securing the attachment cord to the molding assembly.

Referring to FIG. 13, a forming device, generally shown at 40, for injection molding the cord 38 to the retaining portion 20 of the door seal 18 is shown. The forming of the cord 38 is a secondary molding operation. In other words, the window seal 18 is extruded or otherwise formed first and then the cord 38 is molded thereto. The forming device 40 includes a slider 42 moveable relative to a base 44. An actuator 46 is mounted between the slider 42 and the base 44 to effect relative sliding movement. An outer edge 48 of the base 44 and a distal end of the slider 42 cooperate to define a cylindrical cavity where the cord 38 is formed. The outer edge 48 is contoured to be complementary with the shape of the appendage 36. The base 44 is first positioned to abut with the appendage 36 and then the slider 42 is locked relative to the base 44. A suitable material is injection molded into the cavity to form the cord 38. Preferably, the material is compatible with the material used to form the window seal 18 such that the cord 38 will be secured to the window seal 18. The contact area between the cord 38 and the appendage 36 should be sufficient to provide a pulling force to install the appendage 36 around the flange 34 yet should be frangible along the contact surface in a predictable manner. Once the cord 38 had been molded, the slider 42 is retracted relative to the base 44 and then the entire forming device 40 is removed. As appreciated, other aspects of the forming device 40 as well as the injection molding procedure are not discussed in any greater detail as they are well known in the art.

Referring back to FIGS. 1 and 2, at least one glass run channel 50 extends downwardly from the molding strip 24 for guiding the window pane 16 between the open and closed positions. Preferably there are two glass run channels 50 extending downwardly for insertion into the door frame 12. The side sections of the molding assembly 10 along with the glass run channels 50 are typically labeled as glass run channels. Alignment and retention devices (not shown) secure the glass run channels 50 in a position within the door frame 12 which provides for smooth operation of the window pane 16 between the open and closed positions.

Referring again to FIGS. 6 through 8, a retaining member or fastener 52 engages the arm 28 of the molding strip 24 and the window seal 18 for securing each of the molding strip 24 and the window seal 18 within the window opening 14 of the door frame 12 such that the window pane 16 is securely sealed within the window opening 14 when the window pane 16 is in the closed position. The arm 28 of the molding strip 24 includes an upper surface and a lower surface. For illustrative purposes, the upper and lower surfaces are not numbered. It is appreciated that the upper surface is the top of the molding strip 24 as shown in FIGS. 6 and 7 and similarly the lower surface is the bottom of the molding strip 24 as shown in these Figures. The window seal 18 further includes an outwardly extending flange portion 54 engaging one of the upper and lower surfaces of the arm 28. The retaining member 52 fastens the flange portion 54 of the window seal 18 between the arm 28 and the door frame 12. As shown in FIG. 6, a small part of the flange portion 54 of the window seal 18 extends along the exterior surface of the outer panel 32 just above the molding strip 24 which creates an effective seal between the molding strip 24 and the door frame 12. FIG. 7 illustrates a slightly different configuration where the flange portion 54 is not viewable from the exterior of the vehicle.

Preferably, the retaining member 52 is a bolt 52 extending through the arm 28 of the molding strip 24 and the flange portion 54 of the window seal 18 to mount the window seal 18 and the molding strip 24 to the door frame 12. Even more preferably, the upper surface of the arm 28 engages the flange portion 54 of the window seal 18 such that the retaining member 52 engages the lower surface of the arm 28. As appreciated, there may be apertures 55 disposed within the inner 30 or outer 32 panels of the door frame 12, molding strip 24 and window seal 18 to provide for easier engagement of the bolt 52. As also appreciated, there may be any number of retaining members 52 extending around the entire periphery of the window opening 14.

The window seal 18 further includes a resilient flap 56 extending from the flange portion 54 of the window seal 18 with the flap 56 engaging the lower surface of the arm 28 and mounting to the molding strip 24. Specifically, the molding strip 24 has an inwardly projecting hook 58 which engages with the flap 56 to hold the flap 56 against the lower surface of the molding strip 24. As shown in the Figures of the various embodiments, the hook 58 may be of a number of different sizes and configurations. Preferably, the retaining member 52 is disposed between the arm 28 of the molding strip 24 and the flap 56. In other words, the flap 56 conceals the retaining member 52. The flap 56 of the window seal 18 further includes a tubular seal portion 60 for selective sealing engagement with an upper distal end of the window pane 16. The side sections of the window seal 18 shown in FIG. 8 do not include the tubular seal portion 60 and have slightly different configurations for the flap 56 and molding strip 24. As appreciated, the flap 56 can have any suitable configuration so long as the window pane 16 is adequately sealed within the window opening 14. In addition, the molding strip 24 may have slightly different designs which conform to the different sections of the door frame 12.

The retaining portion 20 of the window seal 18 includes a first sealing lip 62 and the flap 56 includes a second sealing lip 64 such that the first 62 and second 64 sealing lips define the channel 22 of the window seal 18. These first 62 and second 64 sealing lips are the primary sealing means for the window seal 18 such that the window pane 16 is adequately sealed within the door frame 12. Preferably, first 62 and second 64 sealing lips are flocked as is conventional in the art.

Figure 9:
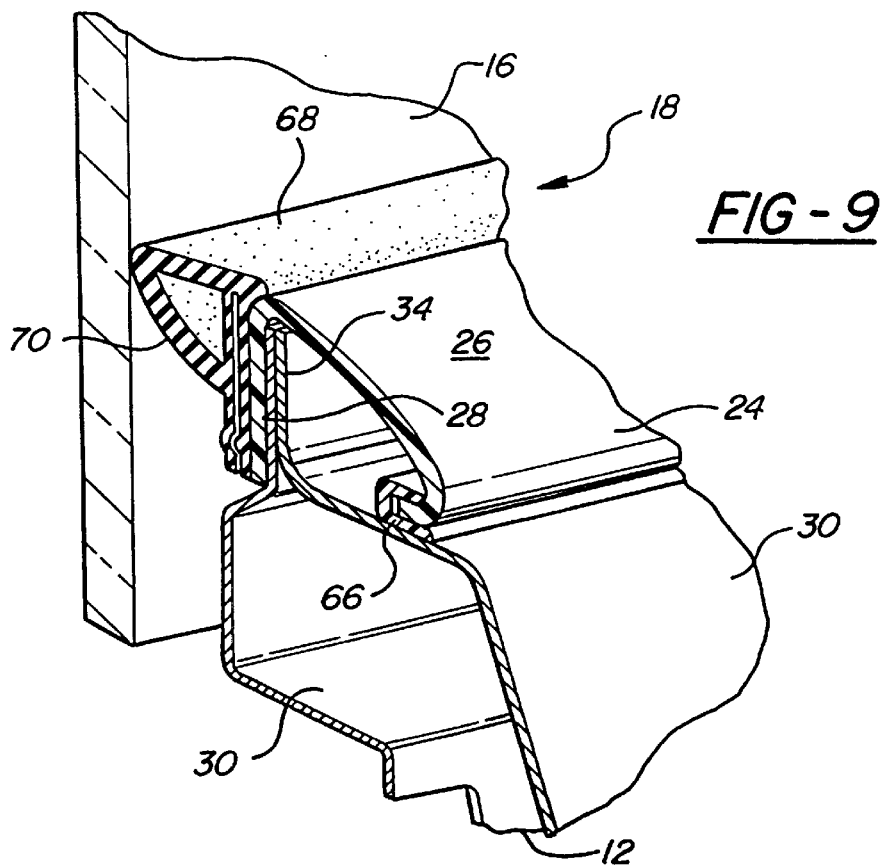
FIG. 9 is a cross-sectional view taken along line 9—9 of FIG. 5.

Referring to FIG. 9, a lower section of the window seal 18 is shown in greater detail. This lower section of the door frame 12 is commonly referred to in the art as a belt line seal. The arm 28 of the molding strip 24 directly engages the flange 34 extending upward from two inner panels 30. A lower U-shaped seal 66 is also provided. The window seal 18 has an offset T-shape with a longer T-portion presenting a first scraping arm 68. The first scraping arm 68 may also be flocked as known in the art. A second window scraping arm 70 is also provided. The window seal 18 is mounted to the molding strip 24 by any suitable adhesive or snap fitting.

Referring to FIGS. 2 through 5, the preferred installation of the molding assembly 10 is now discussed in greater detail. The molding assembly 10 is installed onto the vehicle door frame 12 from the exterior side. The preferred method comprises the following steps; mounting the window seal 18 around a portion, preferably the arm 28, of the molding strip 24; positioning the lower section of the molding strip 24 within the window opening 14; moving the molding strip 24 and window seal 18 toward the window opening 14 to abut the window seal 18 against the door frame 12; fastening the retaining portion 20 of the window seal 18 to the door frame 12 to secure the window seal 18 to the door frame 12; and engaging the retaining member 52 against the molding strip 24 to secure the molding strip 24 and window seal 18 to the door frame 12.

Specifically, the glass run channels 50 are inserted through the window opening 14 and down into a cavity within the door frame 12 between interior and exterior panels. The molding assembly 10 is then pivoted until the molding assembly 10 is fully seated in the window opening 14. At this point the entire window seal 18 will abut the entire periphery of the window opening 14. The attachment cord 38 is detachably secured to the retaining portion 20 of the window seal 18. The cord 38 is then aligned with the flange 34 of the door frame 12. A portion of the cord 38 and attached window seal 18 are extended around the flange 34. The cord 38 is then removed from the retaining portion of the window seal 18 to automatically secure the remaining portions of the window seal 18 to the door frame 12. The removing of the cord 38 is done from the interior side of the door. As the cord 38 is pulled it will the detach from the inward surface of the appendage 36 and thereafter be discarded. The flap 56 of the window seal 18 is then pulled back (as shown in FIG. 7) to expose the lower surface of the arm 28 of the molding strip 24. The bolt 52 or other suitable retaining member 52 passes through the arm 28 and the flange portion 54 of the window seal 18 to mount to the door frame 12. The flap 56 is then pushed upward until the flap 56 engages the hook 58 of the molding strip 24 (as shown in FIG. 6). The installation of the preferred embodiment of the molding assembly 10 is now complete.

Referring to the alternative embodiment of the molding assembly 10 shown in FIG. 10 like numerals indicated like or corresponding parts. The molding assembly 10 has a similar overall configuration as the molding assembly 10 shown in the preferred embodiment of FIG. 2. The primary purpose for the different embodiment is due to a different door frame construction. The door frame 12 of FIG. 2 has the large outer panel 32 which forms a portion of the exterior of the vehicle. The door frame 12 of FIG. 10 eliminates the larger outer panel 32 and has two inner panels 30 coming together to form the flange 34. The molding strip 24 is mounted around the window seal 18 and the inner panels 30 of the door frame 12 such that the flange portion 54 of the window seal 18 is wedged between the lower surface of the molding strip 24 and the door frame 12. The retaining member 52, preferably a bolt 52, passes through the arm 28 of the molding strip 24, the flange portion 54 of the window seal 18, and then secures to the inner panels 30 of the door frame 12. The bolt 52 engages the upper surface of the molding strip 24 and is exposed to the exterior of the door frame 12. The window seal 18 of the alternative embodiment shown in FIG. 10 does include an additional upward extending sealing member 72 which engages a door jam 74 of the vehicle to seal the upper section of the door frame 12 to the vehicle. The remaining portions of the molding assembly 10, such as the retaining portion 20 of the window seal 18, the channel 22, the arm 28 of the molding strip 24, and the flap 56 are essentially the same.

Figure 12:
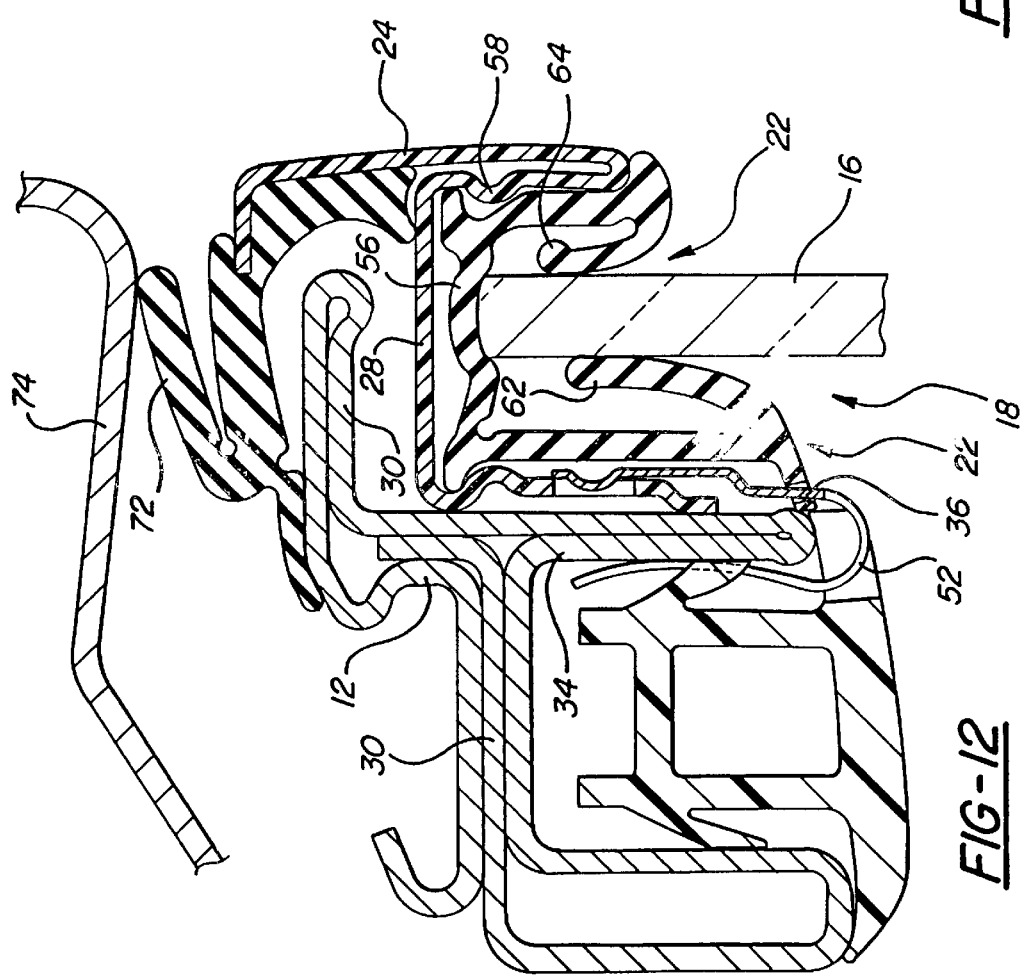
FIG. 12 is a cross-sectional view of yet another alternative embodiment of the molding assembly.

The remaining two alternative embodiments shown in FIGS. 11 and 12 also have like numerals indicating like or corresponding parts. These embodiments of the molding assembly 10 are mounted to door frames 12 which are similar to the door frame 12 of the alternative embodiment shown in FIG. 10. In other words, the embodiments of FIGS. 11 and 12 have inner panels 30 and upwardly extending sealing members 72 which engage door jams 74 of corresponding vehicles. In these embodiments the sealing members 72 are separated from the main window seals 18. Referring to FIG. 12, the retaining member 52 is a clip 52 which extends around the retaining portion 20 of the window seal 18 and the arm 28 of the molding strip 24 to mount the window seal 18 and the molding strip 24 to the inner panel 30 of the door frame 12.

As appreciated, the installation procedures for these alternative embodiments will vary depending upon the unique features of these embodiments. However, the general ease of installation and effectiveness of the overall design remains the same.

As also appreciated, the retaining member 52 may be of any suitable design or configuration so long as the molding strip 24 and window seal 18 are both adequately retained to the door frame 12. The overall scope of the subject invention is not limited in any way by the specific disclosure of the bolt 52 and clip 52 which are illustrated as the preferred retaining members 52 for their corresponding embodiments.

It is apparent to those skilled in the art that the molding assembly 10 of the subject invention is particularly advantageous in that the window seal 18 does not require an extruded metal core to provide structural integrity. The elimination of the extruded metal core reduces the costs and the number of manufacturing steps for the molding assembly 10.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A decorative molding assembly for a vehicle door frame having a window opening for a translating window pane moveable between an open position and a closed position, said assembly comprising;

a window seal having a retaining portion for engagement with the door frame and having a channel for selective sealing engagement with the window pane, a molding strip having an exterior facing surface for creating an outer peripheral border for the window opening of the door frame and an inwardly projecting arm engaging said retaining portion, said arm being wedged between said retaining portion and said channel, and a retaining member engaging said arm of said molding strip and said retaining portion of said window seal for securing each of said molding strip and said window seal to the vehicle door frame about a portion of the window opening;

wherein said retaining portion of said window seal further includes a resilient appendage for securely engaging the door frame and a flange portion abutting said arm of said molding strip for wedging said flange portion between said arm and the door frame.

2. The assembly as set forth in claim 1 wherein said retaining member is a bolt extending through said arm of said molding strip and said flange portion of said window seal for mounting said window seal and said molding strip to the door frame.

3. The assembly as set forth in claim 1 wherein said retaining member is a clip extending around said retaining portion of said window seal and said arm of said molding strip for mounting said window seal and said molding strip to the door frame.

4. The assembly as set forth in claim 1 wherein said window seal further includes a cover portion concealing said retaining member and being movable to enabling access to said retaining member.

5. The assembly as set forth in claim 4 wherein said cover portion is further defined as a resilient flap.

6. The assembly as set forth in claim 5 wherein said retaining member is disposed between said arm of said molding strip and said flap.

7. The assembly as set forth in claim 5 wherein said retaining portion of said window seal includes a first sealing lip and said flap includes a second sealing lip such that said first and second sealing lips border said channel of said window seal.

8. The assembly as set forth in claim 7 wherein said flap of said window seal further includes a tubular seal portion for selective sealing engagement with an upper periphery of the window pane.

9. The assembly as set forth in claim 4 wherein said window seal has a pair of sealing lips for engaging opposite sides of the window pane.

\* \* \* \* \*